United States Patent

[11] 3,607,968

| [72] | Inventors | Walter Schenk<br>Bad Duerkheim;<br>Hans Boehm, Speyer, both of Germany |
|---|---|---|
| [21] | Appl. No. | 49,163 |
| [22] | Filed | June 23, 1970 |
| [45] | Patented | Sept. 21, 1971 |
| [73] | Assignee | Badische Anilin- & Soda-<br>Fabrik Aktiengesellschaft<br>Ludwigshafen am Rhine, Germany |
| [32] | Priority | July 12, 1969 |
| [33] | | Germany |
| [31] | | P 19 35 504.5 |

[54] ISOMERIZATION OF ALIPHATIC OLEFINS HAVING A TERMINAL DOUBLE BOND
8 Claims, No Drawings

| [52] | U.S. Cl. | 260/683.2 |
|---|---|---|
| [51] | Int. Cl. | C07c 5/24 |
| [50] | Field of Search | 260/683.2 |

[56] References Cited
UNITED STATES PATENTS

| 2,554,202 | 5/1951 | McNeil et al. | 260/683.2 |
|---|---|---|---|
| 2,403,524 | 7/1946 | Hagemann | 260/683.2 |
| 3,235,603 | 2/1966 | Murray et al. | 260/683.2 |
| 3,304,343 | 2/1967 | Mitsutoni | 260/683.2 |

FOREIGN PATENTS

| 1,342,323 | 9/1963 | France | 260/683.2 |
|---|---|---|---|

*Primary Examiner*—Delbert E. Gantz
*Assistant Examiner*—Veronica O'Keefe
*Attorney*—Johnston, Root, O'Keeffe, Keil, Thompson & Shurtleff

ABSTRACT: Isomerization of aliphatic olefins having terminal double bonds while retaining the carbon chain by isomerization of olefins having nine to 22 carbon atoms in the presence of a boron phosphate catalyst at elevated temperature. Isomerization mixtures according to the invention and their components are starting materials for the production of detergents and emulsifiers and auxiliaries for the textile, paper and leather industries.

ISOMERIZATION OF ALIPHATIC OLEFINS HAVING A TERMINAL DOUBLE BOND

The invention relates to a process for the isomerization of aliphatic olefins having a terminal double bond by isomerizing olefins having 9 to 22 carbon atoms in the presence of a boron phosphate catalyst at elevated temperature, the carbon chain being retained.

Petrochemical operations have made $\alpha$-olefins having nine to 22 carbon atoms available for many syntheses, for example for the production of detergents or emulsifiers and auxiliaries for the textile, paper and leather industries. For such applications, however, mixtures of $\alpha$-olefins and olefins which bear the double bond at various possible positions in the molecule, for example the corresponding $\beta$-, $\gamma$-, $\delta$- to ($\omega$–1)-olefins, are much more suitable.

It is known from Ullmanns Encyklopädie der technischen Chemie, volume 10, page 42 that terminal olefins can be isomerized into such mixtures in the presence of cobalt carbonyl hydride, finely divided metals, and hydration or dehydration catalysts. The following are also known as catalysts: alkali metal oxides (Compt. Rend., 267, 170–172 (1968); French Pat. No. 1,273,590), acid silicates (U.S. Pat. No. 2,988,578; Bull. Soc. Chim. Fr., 1967, pages 3271 to 3274; J. Catal., 3, 395 et seq. (1964) and metal carbonyl compounds (U.S. Pat. No. 3,391,216). French Pat. No. 1,342,323 describes the isomerization in the presence of boron phosphate in a stoichiometric amount or in excess. The only examples given are olefins having four to eight carbon atoms.

The chain isomerization into isoolefins which proceeds simultaneously with the shaft of the double bond has however proved to be disadvantageous in all these methods. These methods are unsuitable for long chained olefins having for example nine and more carbon atoms because at the same time as the isomerization there take place polymerizations, cracking of the carbon chain, cyclization phenonomena, discolorations and thus a complete change in the olefin mixture which is detrimental for later use.

The object of the invention is to provide a new process for isomerizing aliphatic olefins having terminal double bond while retaining the carbon chain without appreciable formation of isoolefins and other of the above-mentioned byproducts or decomposition products and without uneconomical purification stages, as for example distillation, in a simpler method.

This and other objects of the invention are achieved and aliphatic olefins having a terminal double bond are advantageously isomerized while retaining intact the carbon chain in the presence of a boron phosphate catalyst at elevated temperature by isomerizing olefins having a terminal double bond and having 9 to 22 carbon atoms in the presence of a boron phosphate catalyst containing boron and phosphorus in a ratio by weight of 1:3.0 to 1:3.29, at a temperature of from 160° to 320° C. in the liquid phase.

Unlike the prior art methods, the process according to the invention gives isomerization mixtures while retaining the carbon chain intact and without appreciable formation of isoolefins and other of the above-mentioned byproducts and decomposition products. Mixtures of long-chained components which are valuable for further processing are thus obtained by a simpler method without expensive purification such as by distillation. Having regard to French Pat. No. 1,342,323 it is surprising that the catalyst according to the invention should achieve these favorable results in the case of long-chained olefins and moreover have a long life even at high space velocities. Boron phosphate having a ratio by weight of boron to phosphorus of 1:2.86 does not catalyze the isomerization of long chained olefins, and in the case of a ratio by weight of boron to phosphorus of 1:3.3 and more than 3.3, the life of the catalyst in the said isomerization is short.

The starting materials used are olefins, as a rule olefins devoid of branching, or mixtures of terminal olefins ($\alpha$-olefins) having 9 to 22, preferably 12 to 20, carbon atoms. Examples of suitable olefins are 1-nonene, 1-dodecene, 1-hexadecene 1-octadecene and 1-docosene. The end products formed by the isomerization are mixtures which contain isomers having different positions of the double bond in addition to a proportion of $\alpha$-olefin which has not been isomerized (about 95 percent to about 3 percent) depending on the temperature and duration of isomerization chosen. In the case of a prolonged isomerization the double bond is generally statistically distributed uniformly over all possible positions.

Isomerization is carried out at a temperature of from 160° to 320° C., preferably from 180° to 280° C., at atmospheric, subatmospheric or preferably superatmospheric pressure, particularly at a pressure of from 5 to 20 atmospheres, continuously or batchwise. It is advantageous to start at a low isomerization temperature within the said range and to increase the temperature as the activity of the catalyst decreases. Gas which is inert under the reaction conditions, for example nitrogen, may be used for setting up the pressure required.

Isomerization is carried out in the presence of a boron phosphate catalyst which contains boron and phosphorus in a ratio by weight of from 1:3.0 to 1:3.29, preferably 1:3.20. As a rule from 0.5 to 10 percent, preferably from 2 to 3 percent, by weight of boron phosphate catalyst (based on the starting olefin) is used in batchwise operation. In continuous operation, 0.1 to 0.5 parts by volume of $\alpha$-olefin is generally used per part by volume of catalyst per hour. The boron phosphate catalysts may also be used together with a carrier, particularly a carrier in the form of aluminum compounds and/or silicic acid compounds such as pumice, aluminum oxide, silica gel or diatomaceous earth. The boron phosphate catalyst is generally prepared by gradual heating of a mixture of phosphoric acid and boric acid in the above-mentioned amounts at from 50° to 350° C. followed by comminution of the solid material to a mean particle size of 1 to 8 mm., preferably 2 to 4 mm. For example the temperature of the mixture may be raised from 50° to 100° C. in the course of 8 to 16 hours and the highly viscous material formed left for about 16 to 26 hours in each case at 100° to 120° C., at 150° to 170° C. and at 280° to 320° C. while eliminating the residual water content. The finished catalyst may also be ground again, made into a paste with water, dried and again comminuted for the purpose of further isomerization.

The reaction may be carried out as follows: the $\alpha$-olefin or mixture of $\alpha$-olefins is isomerized in a reactor in the presence of the catalyst at the said temperature. It is advantageous to use a reaction tube or a tubular reactor filled with the catalyst and to pass the starting material continuously through the reactor upward or downward. The rate of flow is advantageously from 0.039 to 0.194 mm. per second in a single passage or 1 to 20 mm. per second in recycle operation. After the isomerization, the mixture is cooled and worked up direct without separation of the individual components. Although direct further processing of the mixture is usually the more economical method it is possible if desired to separate the individual isomers from the mixture by fractional, azeotropic or extractive distillation or adsorption on adsorbents.

Isomerization mixtures which can be prepared by the process according to the invention, and their components, are valuable starting materials for the above-mentioned syntheses. Reference is made to the above-mentioned publications for details of use.

The following examples illustrate the invention. The parts specified in the following examples are parts by weight. They bear the same relation to parts by volume as the kilogram to the liter.

EXAMPLE 1

Production of the catalyst

A mixture of 240.5 parts of 75 percent by weight phosphoric acid is heated with 101 parts of powdered boric acid (100 percent) to 50° C. in a heatable stirred vessel and then the temperature is gradually raised in the course of 12 hours to 100° C. with the simultaneous evaporation of water. The viscous paste formed in the reaction into boron phosphate is then dried first for 24 hours at 110° C. and then for 25 hours at 160° C. in a dryer. The catalyst material is then kept at 300° C. for another 24 hours (activation) and finally broken up to a particle size of 2 to 4 mm. The catalyst prepared in this way is then charged into the reactor without dust formation.

Isomerization

Forty parts by volume of a mixture of olefins having 14 to 18 carbon atoms and a terminal double bond which has been stored under nitrogen is supplied per hour. The mixture, after having been predried in a filter charged with a siccative, is pumped through a preheater and heated to about 190° C.

The hot olefin mixture is then introduced at 15 atmospheres into a reactor consisting of chromium nickel steel tubes having a diameter of 41 mm. which is filled with 280 parts of boron phosphate catalyst. One-thousand parts by volume of olefin is recycled per hour through the reactor by means of a circulating pump so as to ensure uniform flow through all the catalyst tubes and a uniform distribution of temperature. Forty parts per volume of isomerization mixture is flashed per hour through a pressure regulator into a heat exchanger and cooled to 25° C.

Analytical results

| $C_{17}$–$C_{18}$ α-olefins, molecular weight 228, prior to isomerization | melting point: +6° C. boiling point: 280° to 285° C. color number: 3 to 4 sulfur content: 15 p.p.m. vinyl number: 98% |
|---|---|
| isomerized olefin after isomerization | melting point: −8.8° C. boiling point: 285° to 290° C. vinyl number: 8% color number: 4 to 5. |

Color number measurements are carried out with the photoelectric colorimeter of Klett Manufacturing Co. Inc., New York with green filter No. 54 (500–570 millimicrons) and 20 mm. sample path length.

The α-olefin content and the amount of cis- and trans-olefins are determined with a spectrometer 521 of the Perkin Elmer Corporation. The reference value for the absorbande is determined with pure α-pentadecene and the measured value of the olefin mixture are referred to this.

The α-olefin content is measured with a 30-micron cell at 1,600 cm.[11] and 910 cm.[11], the trans-olefins with the same cell at 965 cm.[11] and the cis-olefins in a 223-micron cell at 580 cm.[11].

The $CH_3$ absorbance takes place in the 30-micron cell at 1,375 cm.[11]; it rises during the isomerization by formation of the terminal methyl group.

Gas chromatographic analysis indicates no difference between the starting olefins and the isomerized olefins as regards chain length distribution and chain structure.

EXAMPLE 2

Seven parts by volume of boron phosphate chips, prepared in a manner analogous to example 1, are filled into a tubular reactor having a diameter of 70 mm. 1 part by volume of a mixture of α-olefins having 14 to 20 carbon atoms, consisting of 2.2% by weight of $C_{14}$-olefin
20.4% by weight of $C_{15}$-olefin
22.4% by weight of $C_{16}$-olefin
19.6% by weight of $C_{17}$-olefin
16.8% by weight of $C_{18}$-olefin
11.9% by weight of $C_{19}$olefin and
6.6% by weight of $C_{20}$-olefin is pumped upwardly through the reactor at 170° C. The temperature is raised to 208° C in the course of 14 months. During this time 10,100 parts by volume of α-olefin is isomerized by the catalyst charge without the catalyst losing its effectiveness.

Infrared analysis values

| | before isomerization | after isomerization |
|---|---|---|
| vinyl number (α-olefin content) | 96% | 1.5% |
| cis-olefins | 0% | 7% |
| trans-olefins | 3–4% | 81% |
| $CH_3$ absorbance (occasioned by terminal methyl groups) | 0.195 | 0.245–0.255 |

EXAMPLE 3

Two-hundred-eighty parts of boron phosphate, prepared as described in example 1, is treated with 500 parts of water, intimately mixed with 380 parts of pumice (particle size 5–8 mm.) and then dried at 100° C. After having been broken up (particle size 4 to 6 mm.) the catalyst material is activated by heating for another three hours at 300° C.

A reaction tube having a diameter of 30 mm. and a length of 2 meters is filled with 1 part by volume of this supported catalyst and 0.2 part by volume of a mixture of $C_{15}$–$C_{18}$ olefins is passed per hour upwardly through the tube at 170° C. and atmospheric pressure. The temperature is gradually raised to 275° C. in the course of the isomerization.

In the course of 6 months, 864 parts by volume of olefin is isomerized with the same catalyst charge.

The isomerization mixture obtained gives the following infrared analysis values:

| | before isomerization | after isomerization |
|---|---|---|
| vinyl number | 96% | 4% |
| cis-olefins | 0% | 7% |
| trans-olefins | 3–4% | 83% |
| $CH_3$ absorbance | 0.195 | 0.260–0.270 |

We claim:
1. A process for the isomerization of aliphatic olefins having a terminal double bond while retaining the carbon chain in the presence of a boron phosphate catalyst at elevated temperature wherein
   olefins having a terminal double bond and 9 to 22 carbon atoms are isomerized in the presence of a boron phosphate catalyst which contains boron and phosphorus in a ratio by weight of from 1:3 to 1:3.29 at a temperature of from 160° to 320° C. in the liquid phase.
2. A process as claimed in claim 1 wherein the isomerization is carried out with olefins having a terminal double bond (α-olefins) and having 12 to 20 carbon atoms.
3. A process as claimed in claim 1 wherein isomerization is carried out at a temperature of from 180° to 280° C.
4. A process as claimed in claim 1 wherein isomerization is carried out at a pressure of from 5 to 20 atmospheres.
5. A process as claimed in claim 1 wherein isomerization is carried out in the presence of a boron phosphate catalyst which contains boron and phosphorus in a ratio by weight of 1:3.20.
6. A process as claimed in claim 1 wherein isomerization is carried out with 0.5 to 10 percent by weight of boron phosphate catalyst, based on the starting olefins.
7. A process as claimed in claim 1 wherein isomerization is carried out with 2 to 3 percent by weight of boron phosphate catalyst, based on the starting olefins.
8. A process as claimed in claim 1 wherein isomerization is carried out with 0.1 to 0.5 part by volume of α-olefin per part by volume of catalyst per hour.

PO-1050
(5/69)

UNITED STATES PATENT OFFICE
CERTIFICATE OF CORRECTION

Patent No. 3,607,968                         Dated September 21, 1971

Inventor(s) Walter Schenk and Hans Boehm

It is certified that error appears in the above-identified patent and that said Letters Patent are hereby corrected as shown below:

Column 1, line 74, "1-hexadecene 1-" should read -- 1-hexadecen 1- --.

Column 3, lines 44, 45, and 46, "cm.$^{11}$" should read -- cm.$^{-1}$ --.

Signed and sealed this 21st day of March 1972.

(SEAL)
Attest:

EDWARD M. FLETCHER, JR.
Attesting Officer

ROBERT GOTTSCHALK
Commissioner of Patents